US007323246B2

(12) United States Patent
Iijima et al.

(10) Patent No.: US 7,323,246 B2
(45) Date of Patent: Jan. 29, 2008

(54) NANO HORN CARRIER AND METHOD OF MANUFACTURING THE CARRIER

(75) Inventors: Sumio Iijima, Aichi (JP); Masako Yudasaka, Ibaraki (JP)

(73) Assignees: Japan Science and Technology Agency, Saitama (JP); NEC Corporation, Tokyo (JP)

( * ) Notice: Subject to any disclaimer, the term of this patent is extended or adjusted under 35 U.S.C. 154(b) by 0 days.

(21) Appl. No.: 10/506,798

(22) PCT Filed: Feb. 21, 2003

(86) PCT No.: PCT/JP03/01928

§ 371 (c)(1),
(2), (4) Date: Oct. 15, 2004

(87) PCT Pub. No.: WO03/074418

PCT Pub. Date: Sep. 12, 2003

(65) Prior Publication Data
US 2005/0158462 A1 Jul. 21, 2005

(30) Foreign Application Priority Data
Mar. 7, 2002 (JP) .............................. 2002-062530

(51) Int. Cl.
B32B 9/00 (2006.01)

(52) U.S. Cl. .................... 428/408; 977/742; 423/447.1

(58) Field of Classification Search ................ 428/408; 423/445 R; 427/448; 977/DIG. 1
See application file for complete search history.

(56) References Cited

FOREIGN PATENT DOCUMENTS

| JP | 2001-35361 | A | | 2/2001 |
|----|------------|---|---|--------|
| JP | 2001-064004 | | * | 3/2001 |

OTHER PUBLICATIONS

JP2001-035361A (Translation).*
Iijima et al., S., "Nano-aggregates of single-walled graphitic carbon nano-horns", Chem. Phys. Lett., Aug. 13, 1999, vol. 309, No. 3/4, pp. 165-170.

* cited by examiner

Primary Examiner—John J. Zimmerman
Assistant Examiner—Daniel Miller
(74) Attorney, Agent, or Firm—Wenderoth, Lind & Ponack, L.L.P.

(57) ABSTRACT

A nano horn carrier capable of effectively and conveniently utilizing the tip shape of a carbon nano horn and a method of manufacturing the carrier, the carrier wherein carbon nano horn aggregates (1) are dispersed in dispersion liquid, the dispersion liquid is fed onto a base material (3) and only the dispersion liquid is removed to dispose the carbon nano horn aggregates (1) thereon and a part of all of the carbon nano horn aggregates (1) are covered by fixing material (2) to carry on the fixing material (2), whereby the part or all of the carbon nano horn aggregates (1) can be carried on the fixing material (2).

10 Claims, 4 Drawing Sheets

NANO HORN CARRIER AND METHOD OF MANUFACTURING THE CARRIER

TECHNICAL FIELD

The present invention relates to a nano horn carrier, and its manufacturing method. More particularly, the invention relates to a nano horn carrier capable of utilizing the tip shape of carbon nano horn more effectively and conveniently, and a method of manufacturing the same.

BACKGROUND ART

A carbon nano horn discovered by the present inventors is characterized by a pointed horn shape of tip of carbon nano tube, and is composed of carbon atom planes of mainly graphite structure, same as carbon nano tube. The carbon nano horn is generally manufactured as dahlia-shaped carbon nano horn aggregates gathering multiple carbon nano horns in a spherical form of about 80 to 100 nm in diameter with the horn tip shape set outside. Aside from dahlia-shaped carbon nano horn aggregates, bud-shaped carbon nano horn aggregates are also known, which have a smooth surface, not having pointed protrusions on the surface, and are expressed as buds as compared with flowers of dahlia. Bud-shaped carbon nano horn aggregates are present in a spherical form gathering multiple tubular carbon nano horns which are about 0.3 nm to 3 nm in diameter and several nm to 50 nm in length.

These carbon nano horn aggregates are very wide in surface area, and a mass quantity can be synthesized at high purity, and they are expected to be used as lightweight and inexpensive adsorption materials. On the other hand, by making use of the sharp and pointed tip shape of carbon nano horns with the tip angle of about 20 degrees, it has been attempted to be used in, for example, electron emission element of electric field for thin display device, and a high possibility is recognized in application by making use of the tip shape of carbon nano horns.

However, in the latter study of making use of tip shape of carbon nano horns, basic studies about characteristics of material of carbon nano horns are promoted, but nothing has been studied yet about practical use. That is, for example, although it has been disclosed by the present inventors that carbon nano horns show electric field electron emission characteristics by making use of the characteristic tip shape, nothing has been studied further about installation and control of carbon nano horns in actual use as devices.

The present invention is devised in the light of the above background, and it is hence an object thereof to solve the problems of the prior art, and present a nano horn carrier capable of utilizing the tip shape of carbon nano horn more effectively and conveniently, and a method of manufacturing the same.

DISCLOSURE OF INVENTION

To solve the problems of the prior art, the invention presents as follows.

It is a first aspect of the invention to provide a nano horn carrier, wherein two or more carbon nano horn aggregates are bonded and mutually carried, it is a second aspect to provide a nano horn carrier, wherein a part or all of carried carbon nano horn aggregates are fixed on a base material, it is a third aspect to provide a nano horn carrier in which carbon nano horn aggregates are fixed on a base material by a fixing material, it is a fourth aspect to provide a nano horn carrier in which the base material has an arbitrary shape, it is a fifth aspect to provide a nano horn carrier in which the base material is any one of glass, ceramics, metal, alloy, semiconductor, and organic matter, it is a sixth aspect to provide a nano horn carrier in which the shape is variable, and it is a seventh aspect to provide a nano horn carrier in which the tip of carbon nano horn is projecting from the surface of the fixing material.

It is an eighth aspect of the invention to provide a manufacturing method of nano horn carrier characterized by dispersing carbon nano horn aggregates in a dispersion liquid, supplying this dispersion liquid on a base material, removing only the dispersion liquid to dispose carbon nano horn aggregates, and covering a part or all of the carbon nano horn aggregates with a fixing member to carry on the fixing member, it is a ninth aspect to provide a manufacturing method of nano horn carrier characterized by dispersing carbon nano horn aggregates in a dispersion liquid, supplying this dispersion liquid on a base material in which a fixing material layer is formed preliminarily, removing only the dispersion liquid to dispose carbon nano horn aggregates, and pressing the carbon nano horn aggregates from above to the fixing material surface in a softened state layer to carry on the fixing member, and it is a tenth aspect to provide a manufacturing method of nano horn carrier characterized by dispersing carbon nano horn aggregates in a dispersion liquid, supplying this dispersion liquid on a base material, removing only the dispersion liquid to dispose carbon nano horn aggregates, and heating to 1200 to 2000° C. to bond mutually the carbon nano horn aggregates and carry on each other.

In addition, it is an eleventh aspect of the invention to provide a manufacturing method of nano horn carrier in which the base material has an arbitrary shape, it is a twelfth aspect to provide a manufacturing method of nano horn carrier in which the base material is any one of glass, ceramics, metal, alloy, semiconductor, and organic matter, it is a thirteenth aspect to provide a manufacturing method of nano horn carrier in which the base material is composed of a chemically or thermally unstable material, it is a fourteenth aspect to provide a manufacturing method of nano horn carrier in which the base material is removed, it is a fifteenth aspect to provide a manufacturing method of nano horn carrier in which the base material is removed by a solvent, it is a sixteenth aspect to provide a manufacturing method of nano horn carrier in which the base material is removed by heating, it is a seventeenth aspect to provide a manufacturing method of nano horn carrier in which the fixing material is any one of organic polymer, metal, alloy, and inorganic matter, it is an eighteenth aspect to provide a manufacturing method of nano horn carrier in which the fixing material is a material softened by heat of 1500° C. or less, it is a nineteenth aspect to provide a manufacturing method of nano horn carrier in which the fixing material is a metal or alloy of which melting point is 1500° C. or less, it is a twentieth aspect to provide a manufacturing method of nano horn carrier in which the fixing material is a material forming a carbide at 1500° C. or less, it is a twenty-first aspect to provide a manufacturing method of nano horn carrier in which a part of the fixing material covering the carbon nano horn aggregates is selectively removed, it is a twenty-second aspect to provide a manufacturing method of nano horn carrier in which the fixing material is selectively removed by a solvent, it is a twenty-third aspect to provide a manufacturing method of nano horn carrier in which the fixing material is selectively removed by oxygen plasma etching, and it is a twenty-fourth aspect to provide a manufacturing method of nano horn carrier in which the fixing material is selectively removed by heating in an oxygen atmosphere.

BEST MODE FOR CARRYING OUT THE INVENTION

The invention has the following features, and it is specifically described below while referring to the exemplary examples.

Examples of nano horn carrier presented by the invention are shown in FIG. 1(a) to (f). It is a feature of a nano horn carrier of the invention that a part or all of one or two or more carbon nano horn aggregates (1) are carried on a fixing material (2). In this nano horn carrier, carbon nano horn aggregates (1) may be either dahlia-shaped carbon nano horn aggregates (1) gathering multiple carbon nano horns in a spherical form of about 80 to 100 nm in diameter with the horn tip shape set outside, or bud-shaped carbon nano horn aggregates (1) which have a smooth surface, not having pointed protrusions on the surface. In this nano horn carrier, carbon nano horn aggregates (1) may carry either one, for example, as shown in (a) or two or more as shown in (b) to (f). When two or more carbon nano horn aggregates (1) are carried in this nano horn carrier, the carbon nano horn aggregates (1) may be disposed at arbitrary regular or irregular intervals, for example, as shown in (b), or may be disposed adjacently and densely, either regularly or irregularly as shown in (c). Further, in this nano horn carrier, one carbon nano horn aggregate (1) may be disposed in the thickness direction, or two or more carbon nano horn aggregates (1) may be disposed. That is, in the nano horn carrier of the invention, carbon nano horn aggregates (1) may be disposed so as to obtain the desired characteristics or shape. In the nano horn carrier of the invention, as shown in (a) to (e), for example, all carbon nano horn aggregates (1) may be carried on the fixing material (2), or, as shown in (f), a part of gathering of carbon nano horn aggregates (1) may be carried on the fixing material (2).

In the invention, for example, the fixing member (2) may carry all of carbon nano horn aggregates (1) as shown in (a) to (c), or carry a part as shown in (d) to (f). The fixing material (2) is not specified in material as far as it can be supplied in carbon nano horn aggregates (1) in specific configuration, and a part or all of carbon nano horn aggregates (1). Such fixing material (2) may include various organic polymers, metal or alloy, and inorganic matter. Specifically, depending on the purpose, usable examples include epoxy resin adhesive, rubber adhesive, polymethyl methacrylate (PMMA), polyethylene (PE), polyvinyl chloride (PVC), and other polymers. Materials softened by heating at 1500° C. or less may be also used, for example, specifically, indium, gallium, lead, gold and others metals and alloys of which melting point is 1500° C. or less, and also silicon (Si), titanium (Ti) and other materials forming carbides at 1500° C. or less may be used.

Figure 2:
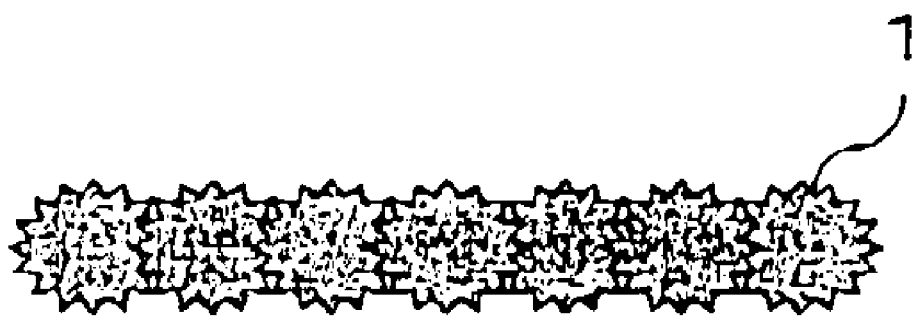
FIG. 2 is a diagram showing an example of nano horn carrier of the invention.
Figure 3:
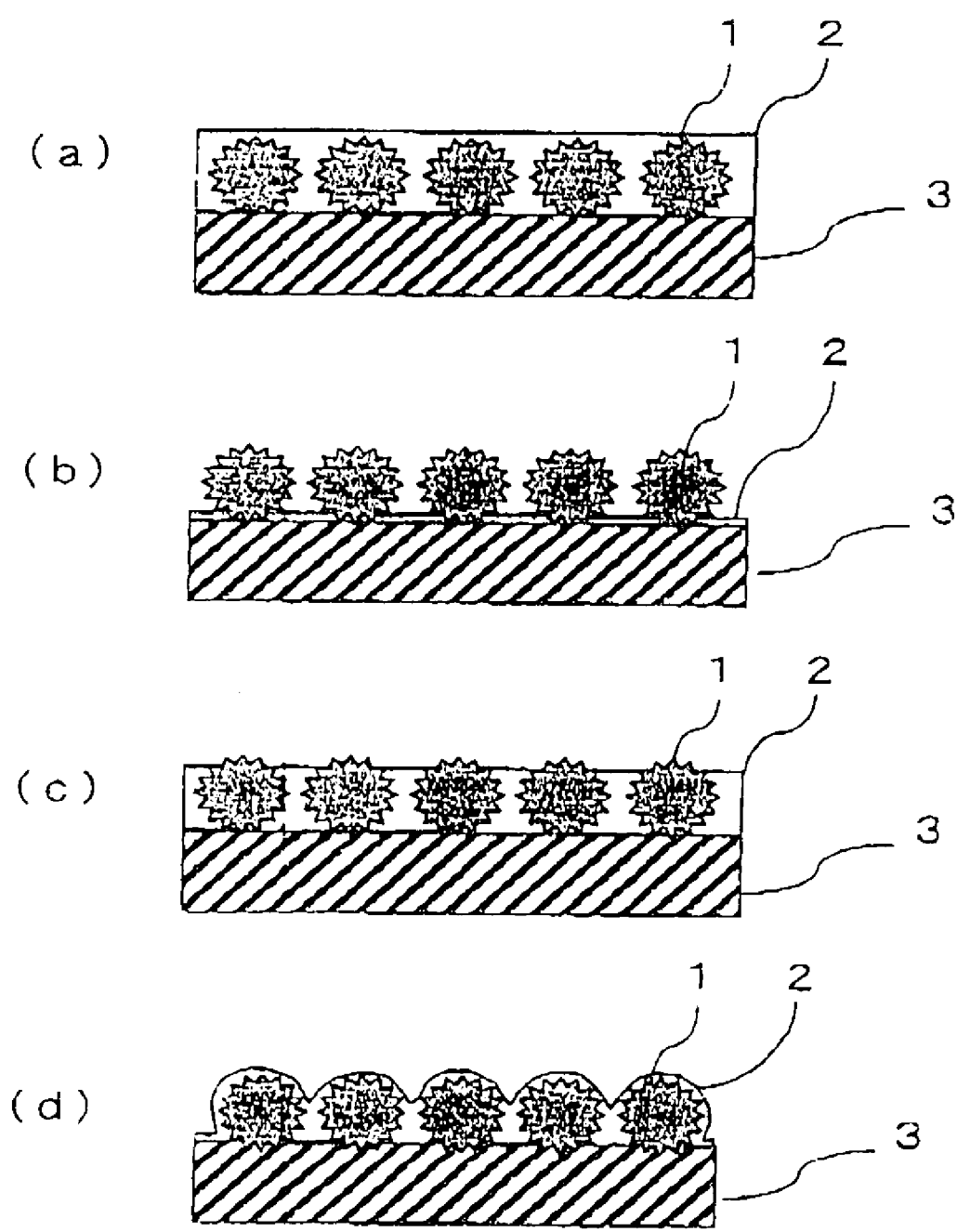
FIG. 3 is a diagram showing an example of nano horn carrier of the invention.

The nano horn carrier of the invention may be composed of two or more carbon nano horn aggregates (1) being bonded and carried on each other as shown in FIG. 2, for example. The configuration of two or more carbon nano horn aggregates (1) is arbitrary as mentioned above.

A part or all of nano horn carrier of the invention may be fixed on a base material (3) as shown in FIG. 3(a) to (d), for example. For fixing on the base material (3), various materials may be used, and, for example, the fixing material (2) may be also used.

In the invention, the base material (3) is not particularly specified in material or shape, and glass, ceramics, metal, alloy, semiconductor, inorganic mater, or organic matter may be used. The shape is arbitrary, including plate, mesh, fiber, needle, sphere, or geometrical shape. The surface shape may be flat, undulated, curved, slit, etc.

The nano horn carrier of the invention may realize a specific shape by properly selecting the materials of fixing material (2) and base material (3), or a nano horn carrier of variable shape may be also formed. More specifically, by using cloth, sheet or fiber consisting of various materials of paper or high polymer as the base material (3), a nano horn carrier free to curve, deflect or expand may be realized. Thus, in the nano horn carrier of the invention, the fixing material (2) and base material (3) may be properly selected depending on the purpose, and a wider possibility is realized in application.

Figure 1:
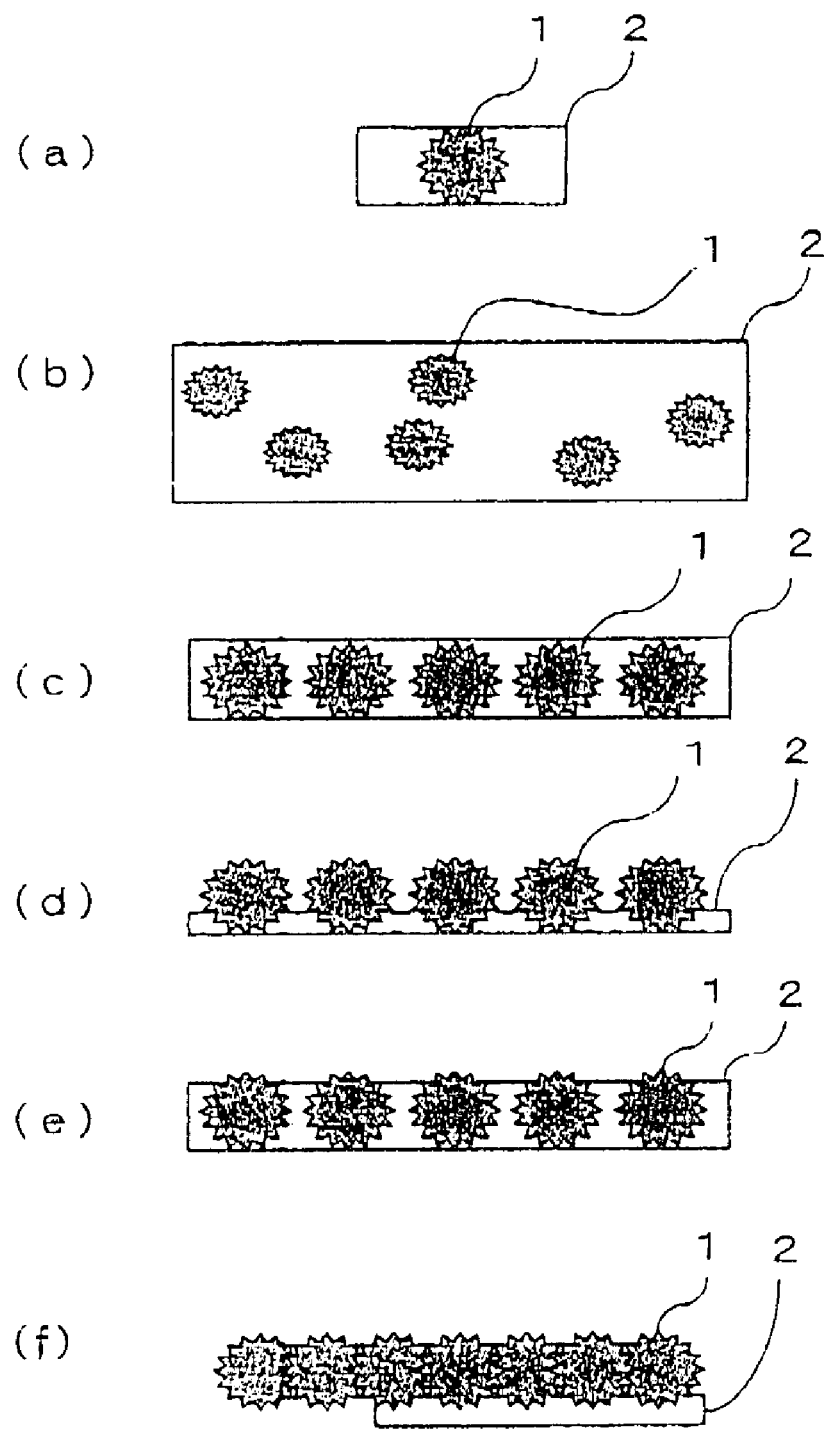
FIG. 1 is a diagram showing an example of nano horn carrier of the invention.

The nano horn carrier of the invention may be composed of carbon nano horn aggregates (1) of any configuration being completely covered with the fixing material (2), and the surface of the nano horn carrier may be composed of fixing material (2) only, or as shown in FIGS. 1(d) and (e), part of carbon nano horn aggregates (1) maybe exposed on the surface. Further, characteristically, in the nano horn carrier of the invention, only the tip of carbon nano horn may be projecting from the surface of the fixing material (2), for example, as shown in FIG. 1(e). The nano horn carrier of such projecting tip of carbon nano horn is specifically described below, and it can be manufactured easily as required from the nano horn carrier of the invention of which surface is completely covered with the fixing material (2). That is, the nano horn carrier of the invention can be easily changed in form as required.

The nano horn carrier of the invention as the above may be manufactured in various methods depending on the purpose. For example, in a manufacturing method of nano horn carrier of the invention, carbon nano horn aggregates (1) are disposed in a dispersion liquid, the dispersion liquid is supplied on a base material (3), only the dispersion liquid is removed to dispose carbon nano horn aggregates (1), and a part or all of the carbon nano horn aggregates (1) are covered with a fixing material (2) and carried on the fixing material (2).

In the invention, carbon nano horn aggregates (1) manufactured in various known methods may be used. For example, the carbon nano horn aggregates (1) can be manufactured by a synthesizing method by CO2 laser ablation using a catalyst-free graphite target in Ar atmosphere at room temperature and 760 Torr.

The dispersion liquid may be, for example, water, carbon disulfide, acid, other inorganic solvent, benzene, toluene, xylene, other hydrocarbon, methanol, ethanol, other alcohol, ether, its derivative, other organic solvent, or their mixture. For the ease of removal of dispersion liquid, a volatile dispersion liquid may be used. In this dispersion liquid, carbon nano horn aggregates (1) are put and dispersed. To disperse carbon nano horn aggregates (1) in the dispersion liquid, for example, they may be agitated by using a stirrer, or lightly exposed by ultrasonic waves by using an ultrasonic cleaner or the like.

The dispersion liquid in which carbon nano horn aggregates (1) are dispersed is supplied on the base material (3). As mentioned above, the base material (3) is not specified in material or shape, and an arbitrary material may be used. To supply the dispersion liquid of carbon nano horn aggregates (1) on the base material (3), any known method may be employed. Specific examples are casting method, coating method, spin coating method, and spraying method.

By removing the dispersion liquid only, carbon nano horn aggregates (1) are disposed on the base material (3). Herein, by properly selecting the concentration of carbon nano horn aggregates (1) in the dispersion liquid or supplying method of dispersion liquid, the configuration of carbon nano horn aggregates (1) on the nano horn carrier can be adjusted. The dispersion liquid may be removed depending on the properties of the dispersion liquid. For example, by keeping at a proper temperature, the dispersion liquid may be removed by vaporization. Or by using the base material (3) made of filter of metal, glass or resin, for example, by supplying the dispersion liquid on the base material (3) while sucking and filtering, only the dispersion liquid can be removed.

In succession, a part or all of carbon nano horn aggregates (1) disposed on the base material (3) are covered with the fixing material (2), and carried on the fixing material (2). The fixing material (2) is, as mentioned above, selected from various polymers, organic matter, metal or alloy, and inorganic matter, any material softened by heating at 1500° C. or less, or material forming carbides at 1500° C. or less. The covering method includes various methods. For example, the fixing material (2) prepared in a liquid form can be applied on the carbon nano horn aggregates (1) by casting method, coating method or spraying method, then solidified, and a part or all of carbon nano horn aggregates (1) can be covered with the fixing material (2) and carried on the fixing material (2).

On the carbon nano horn aggregates (1) disposed on the base material (3), the fixing material (2) in, for example, sheet or powder form is put and heated, and the fixing material (2) is fused and supplied in carbon nano horn aggregates (1), and solidified, and thereby a part or all of carbon nano horn aggregates (1) are covered with the fixing material (2) and carried on the fixing material (2).

As a result, a part or all of carbon nano horn aggregates (1) are carried on the fixing material (2) and fixed on the base material (3), and the nano horn carrier of the invention is manufactured.

In other manufacturing method of nano horn carrier of the invention, carbon nano horn aggregates (1) are dispersed in a dispersion liquid containing a fixing material (2), and the dispersion liquid is supplied on a base material (3), and solidified. That is, the dispersion liquid of carbon nano horn aggregates (1) supplied on the base material (3) is solidified.

In this method of the invention, the dispersion liquid containing the fixing material (2) may be any liquid solidifying gradually along with progress of reaction, or solidified by heating, cooling, irradiation with ultraviolet rays or other process. Specifically, preferred examples are polymethyl methacrylate (PMMA), polyethylene (PE), polyvinyl chloride (PVC), thermoplastic resin, thermosetting resin, ultraviolet curing resin, and other polymers being mixed in the dispersion liquid. The method of dispersing carbon nano horn aggregates (1) in the dispersion liquid containing the fixing material (2), and the method of supplying this dispersion liquid on the base material (3) may be same as mentioned above. Thus, a part or all of carbon nano horn aggregates (1) are carried on the fixing material (2) and fixed on the base material (3), and the nano horn carrier of the invention is manufactured.

Further, in the method of the invention, by heating the carbon nano horn aggregates (1) disposed on the base material (3) after removing the dispersion liquid at 1200 to 2000° C., the carbon nano horn aggregates (1) are mutually bonded and carried on each other. As a result, the nano horn carrier having the tip of the carbon nano horn projecting from the surface of the fixing material (2) can be manufactured.

In this method, a part or all of carbon nano horn aggregates (1) are mutually carried and fixed on the base material (3), and the nano horn carrier of the invention is manufactured.

In a different method of the invention, by using the carbon nano horn carrier manufactured in any preceding method of the invention, by selectively removing a part of the fixing material (2) covering the carbon nano horn aggregates (1), the tip of the carbon nano horn can be projected on the surface. This selective removal of the fixing material (2) may be done successively after the process of covering and carrying the carbon nano horn aggregates (1) with the fixing material (2), or may be done at any arbitrary timing. In this method of the invention, by dissolving the fixing material (2), for example, by using a solvent having a dissolving power of the fixing material (2), a part of the fixing material (2) can be removed selectively. Also, for example, by oxygen plasma etching, the fixing material (2) covering the surface and tip of the carbon nano horn may be ashed and removed selectively, or it may be also removed selectively by heating in oxygen atmosphere.

As a result, the tip of carbon nano horn is projecting from the surface of the fixing material (2), and the nano horn carrier of the invention is manufactured.

In a further manufacturing method of nano horn carrier of the invention, carbon nano horn aggregates (1) are dispersed in a dispersion liquid, this dispersion liquid is supplied on a base material (3) on which a fixing material (2) layer is formed preliminarily, only the dispersion liquid is removed to dispose carbon nano horn aggregates (1), and with the fixing material (2) layer being softened, carbon nano horn aggregates (1) are pressed from above to be carried on the fixing material (2). In this manufacturing method of nano horn carrier, different from the foregoing methods of the invention, the fixing material (2) is preliminarily supplied on the base material (3) to form the fixing material (2) layer, and the dispersion liquid is supplied thereon to dispose carbon nano horn aggregates (1).

In this method, the fixing material (2) is preferably made of a material softened by any means. For example, as mentioned above, the fixing material may be a material softened by heating at 1500° C. or less. More specifically, examples are indium, gallium, lead, gold, other metal and alloy, oxide and salt having melting point of 1500° C. or less. Such fixing material is supplied on the base material (3) by an arbitrary method, and a fixing material (2) layer is formed. On this fixing material (2) layer, the dispersion liquid of carbon nano horn aggregates (1) is supplied, and removing only the dispersion liquid, the carbon nano horn aggregates (1) are disposed, and then the fixing material (2) layer is softened by heating or other means, for example. In this method of the invention, the method of dispersing the carbon nano horn aggregates (1) in the dispersion liquid, the method of supplying the dispersion liquid on the base material (3) preliminarily formed the fixing material (2), and the method of removing the dispersion liquid only maybe same as in the foregoing methods of the invention.

Successively, in the softened state of the fixing material (2) layer, the carbon nano horn aggregates (1) are pressed from above, for example, by a pressing plate having a same surface shape of the base material (3), and a part or all of carbon nano horn aggregates (1) are disposed in the fixing material (2) layer. By solidifying the fixing material (2), the carbon nano horn aggregates (1) are carried on the fixing material (2).

In this method, too, a part or all of carbon nano horn aggregates (1) are carried on the fixing material (2) and fixed on the base material (3), and the nano horn carrier of the invention is manufactured.

According to this method of the invention, further, by adjusting the degree of pressing, the configuration of carbon nano horn aggregates (1) in the fixing material (2) layer can be controlled. Therefore, by decreasing the degree of pressing, the carbon nano horn aggregates (1) may be exposed on the surface of the fixing material (2), or the tip of the carbon nano horn may be projecting from the surface of the fixing material (2), and fixed on the base material (3), and the nano horn carrier of the invention is manufactured.

In this case, if the carbon nano horn is buried too much in the fixing material (2) layer, as mentioned above, the fixing material can be selectively removed by dissolving the fixing material (2) by solvent, or oxygen plasma etching or heating in oxygen atmosphere. As a result, the tip of the carbon nano horn is projecting from the surface of the fixing material (2), and the nano horn carrier can be manufactured.

On the other hand, in the method of the invention, it may be also considered to remove the base material (3) of the nano horn carrier manufactured in these methods. By removing the base material (3), the nano horn carrier of the invention not fixed on the base material (3) may be realized. In addition, by removing the base material (3), for example, only the tip of the carbon nano horn contacting with the base material (3) is projected from the surface of the fixing material (2), and the nano horn carrier having only the tip of the carbon nano horn projecting from the surface of the fixing material (2) may be manufactured more easily.

To remove the base material (3), for example, depending on the combination of the base material (3) and fixing material (2), it may be realized easily by peeling the base material (3) and carbon nano horn aggregates (1) partly or wholly carried on the fixing material (2). When attempting to remove the base material (3) by peeling, it is preferred to keep smooth the surface of the base material (3). In other method of removing the base material (3), for example, the base material (3) can be removed by dissolving the base material (3) by using a solvent not having dissolving power on the fixing material (2) but having dissolving power on the base material (3), or depending on the material of the base material (3), it may be fused or evaporated by heating. Further, the base material (3) may be selectively removed by oxygen plasma etching. That is, by using a chemically or thermally stable material for the fixing material (2), and by using a chemically or thermally unstable material for the base material (3), the base material (3) can be removed by chemical or thermal technique.

Exemplary examples are shown below together with the accompanying drawings, the invention is further described below.

EXAMPLES

Example 1

Putting carbon nano horn aggregates in hexane as dispersion liquid, ultrasonic waves were emitted to disperse in hexane. This dispersion liquid was supplied on the crystal surface of NaCl used as base material in a thickness of about several microns, and hexane was evaporated to dispose carbon nano horn aggregates on the base material. The crystal surface of NaCl was preliminarily polished for later SEM observation. In succession, from above the carbon nano horn aggregates, epoxy resin was applied as fixing material, and after firming curing of epoxy resin, NaCl was dissolved in water and removed. As a result, a nano horn carrier was obtained in a state of the tip of carbon nano horn projecting on the surface of epoxy resin.

The surface of the nano horn carrier was observed by scanning electron microscope (SEM), and since the carbon nano horn was projected on the surface, the surface could be observed at high resolution without occurrence of charge-up.

Thus, in the nano horn carrier of the invention, in a state of keeping electron emission characteristic from the carbon nano horn tip, carbon nano horn aggregates are carried on the fixing material. Therefore, this nano horn carrier is confirmed to be very useful for use as, for example, electric field electron emission element of carbon nano horn aggregates.

Figure 4:
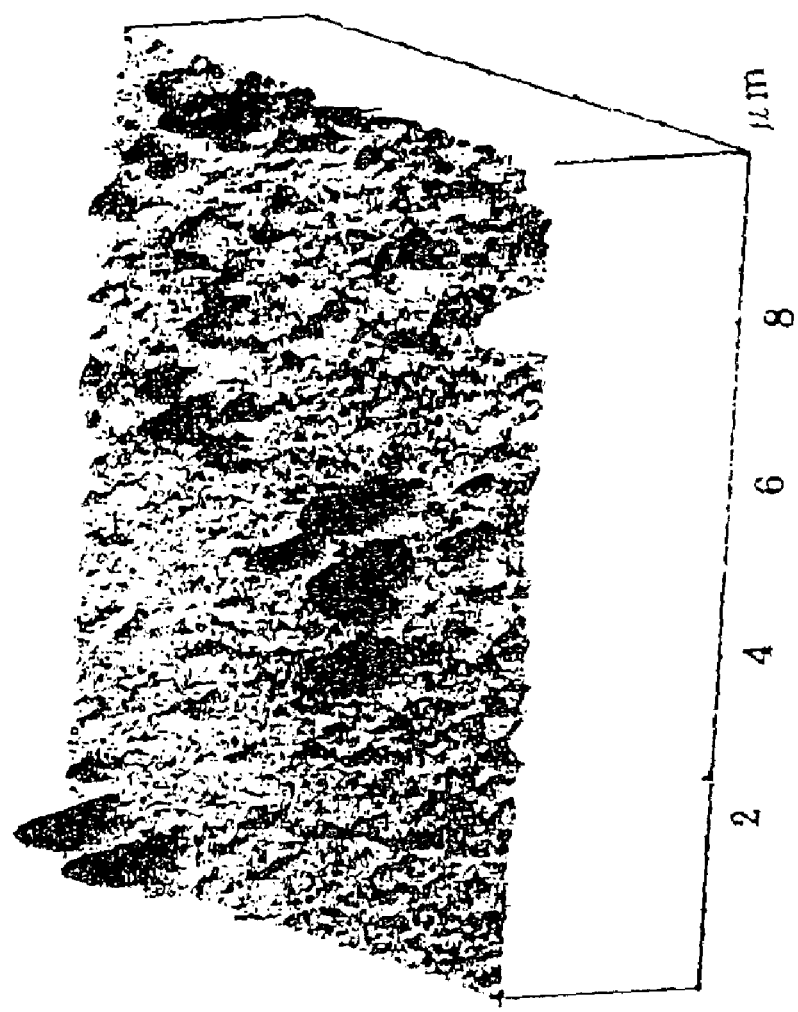
FIG. 4 is a diagram showing an example of observation result by atomic force microscope (AFM) of surface of nano horn carrier manufactured in an example.

Since epoxy resin was adhered to part of the projecting carbon nano horn, the epoxy resin was removed by oxygen plasma etching. The surface of this nano horn carrier was more closely observed by atomic force microscope (AFM). An AFM image is shown in FIG. 4. A clear projection of tip of carbon nano horn from the surface of base material was confirmed.

Example 2

On a glass base material, a thin film of indium was deposited in a thickness of about 50 nm as fixing material. On the indium thin film of base material, hexane dispersion liquid of carbon nano horn aggregates was dropped, and carbon nano horn aggregates were disposed. The entire base material was heated to about 120 to 150° C., and the indium thin film was softened, and the layer of carbon nano horn aggregates was pressed from above by a flat plate, and the lower part of carbon nano horn aggregates was fused in indium.

As a result, the lower part of carbon nano horn aggregates was carried on the indium thin film, and a nano horn carrier fixed on a glass base material was obtained.

The invention is not limited to these exemplary examples alone, but it may be changed and modified variously in detail.

INDUSTRIAL APPLICABILITY

As specifically described herein, the invention presents a nano horn carrier capable of utilizing the tip shape of carbon nano horn effectively and easily, and a method of manufacturing the same.

The invention claimed is:

1. A nano horn carrier, wherein two or more carbon nano horn aggregates are bonded by heat treatment at a temperature range from 1200° C. to 2000° C. and mutually carried.

2. The nano horn carrier of claim 1, wherein a part or all of carried carbon nano horn aggregates are fixed on a base material.

3. The nano horn carrier of claim 2, wherein carbon nano horn aggregates are fixed on a base material by a fixing material.

4. The nano horn carrier of claim 2, wherein the base material has an arbitrary shape.

5. The nano horn carrier of claim 2, wherein the base material is any one of glass, ceramics, metal, alloy, semiconductor, and organic matter.

6. The nano horn carrier of claim 1, wherein the shape is variable.

7. The nano horn carrier of claim 1, wherein the tip of carbon nano horn is projecting from the surface of the fixing material.

8. A nano horn carrier, which comprises:
   one or more carbon nano horn aggregates, which are bonded by heat treatment at a temperature range from 1200° C. to 2000° C,
   a base material, and
   a fixing material,
   wherein a part or all of one or more carbon nano horn aggregates is carried and fixed on the base material by the fixing material, and the base material is removable from the fixing material and the carbon nano horn aggregate.

9. The nano horn carrier of claim 8,
   wherein the base material is removable by means selected from the group consisting of peeling, dissolving, fusing, evaporating and oxygen plasma etching.

10. The nano horn carrier of claim 8,
    wherein the base material and the base material are able to curve.

* * * * *